(12) United States Patent
Gehman et al.

(10) Patent No.: US 6,422,034 B2
(45) Date of Patent: Jul. 23, 2002

(54) AIR DEFLECTOR FOR TRUCK WITH REFRIGERATION UNIT

(75) Inventors: J. Timothy Gehman, Fleetwood; Kurt Hallquist, Downingtown, both of PA (US)

(73) Assignee: Morgan Corporation, Morgantown, PA (US)

( * ) Notice: Subject to any disclaimer, the term of this patent is extended or adjusted under 35 U.S.C. 154(b) by 0 days.

(21) Appl. No.: 09/834,082

(22) Filed: Apr. 12, 2001

Related U.S. Application Data

(60) Provisional application No. 60/199,639, filed on Apr. 25, 2000.

(51) Int. Cl.[7] .................................................. F25B 39/04
(52) U.S. Cl. .......................................................... 62/507
(58) Field of Search .......................... 62/404, 407, 239, 62/507

(56) References Cited

U.S. PATENT DOCUMENTS 3,934,923 A * 1/1976 Lissaman et al. ............... 296/1
4,567,734 A * 2/1986 Dankowski ................... 62/186
5,317,880 A * 6/1994 Spears ........................... 62/239

* cited by examiner

*Primary Examiner*—William C. Doerrler
*Assistant Examiner*—Malik N. Drake
(74) *Attorney, Agent, or Firm*—Carella Byrne Bain Gilfillan et al.; Elliot M. Olstein; William Squire

(57) ABSTRACT

An aerodynamic shaped deflector is attached to the roof of a truck cab for reducing drag between the cab and the larger rearward cargo body. The deflector has a front wall with an internal air scoop for channeling air to a refrigeration unit attached to the front wall of the cargo body. The scoop channels air to the refrigeration unit through an opening and grill at the rear of the scoop. The deflector may have an opening in a top wall thereof to permit escape of hot air from the refrigeration unit to the ambient atmosphere. The scoop and its grill at the rear thereof with openings are dimensioned to pass sufficient air required by the refrigeration unit heat exchange coils.

10 Claims, 7 Drawing Sheets

AIR DEFLECTOR FOR TRUCK WITH REFRIGERATION UNIT

This application claims benefit to Provisional application Ser. No. 60/199,639 filed Apr. 25, 2000.

This invention relates to air deflectors used on trucks to reduce wind resistance created by turbulence between the truck cab and the larger rearward body including cabs fixed to bodies and cabs with trailer bodies and including refrigeration units on the truck body rearward of the cab.

U.S. Pat. No. 3,934,923 discloses a porous structure mounted on the cab roof to pass air into the gap between the cab and trailer body to act as a barrier to airflow into the gap at the top and sides. The structure is a flat plate with perforations situated below the plane of the refrigeration unit attached to a front wall of a rearward trailer. The plate is perforated to minimize drag by creating eddie air currents in the space between the cab and trailer. Air flows over the top edge of the deflector to the refrigeration unit, the top edge being significantly lower than the refrigeration unit.

U.S. Pat. No. 4,567,734 discloses an air deflector discloses a louvered housing over the refrigeration unit. This does not address the problem of drag resistance created by the turbulence due to the difference in dimensions of the cab to the rear cargo carrying body.

U.S. Pat. No. 4,611,796 discloses a fairing for aerodynamically braking a tractor-trailer combination utilizing a central pivoting fast acting door within a roof mounted aerodynamic fairing to selectively expose and conceal the front surface of the trailer, masked by the fairing. The door is operated cooperatively with the vehicles brakes. When the door is closed minimum drag is provided and when the door is open maximum drag occurs to assist in braking.

U.S. Pat. No. 4,957,325 discloses an aerodynamically enhanced air grill mounted on a vehicle with an air intake grill and a pair of air discharge grills. This is a louvered box-like structure placed on the roof of a truck cab. An interior V-shaped deflector barrier is also used behind the intake grill. This structure due to its boxy non-aerodynamic shape may provide undesirable drag air currents.

U.S. Pat. No. 5,317,880 discloses a complex louvered structure to control air passing over a tractor trailer. It provides variable redirection of air flow to allow desired effects to be met. It provides for ventilation and cooling for a refrigeration unit and for brake components via air ducts. Air drag can be created selectively to assist in braking. In the louver closed position the refrigeration unit may overheat requiring the louvers to be opened.

Other louvered air deflectors for truck cab roofs are shown in U.S. Pat. Nos. 5,092,648, 5,653,493 and 5,876,088.

An air deflector to reduce turbulence drag according to the present invention for a vehicle including a cab and body, the body being different in size than the cab causing turbulent air resistance between the cab and body, and a refrigeration unit attached to the body front wall adjacent to the cab, the deflector for reducing the turbulent air resistance and comprises first and second spaced side walls and an interconnected top wall; a front wall coupled to the side and top wall; and an air scoop defining a recess in the deflector front wall and connected to the side walls and top wall for directing inlet air to the refrigeration unit.

In one aspect, one of the side and top walls have an opening for exhausting hot air from the refrigeration unit to the ambient atmosphere.

In another aspect, the side walls are arranged to receive the refrigeration unit therebetween so that the refrigeration unit is closely spaced to the scoop.

In a further aspect, the top wall has a U-shaped through opening at a rear edge distal the deflector front wall for exhausting hot air from the refrigeration unit.

In a further aspect, the scoop has a rear wall distal the front wall, the rear wall including a lattice grill.

The deflector of the present invention thus includes a scoop which collects and directs inlet air directly toward the refrigeration unit to supply the unit a high volume of air for the heat exchanger of the unit. The scoop has sides that insure a major portion of the inlet air is directed at the refrigeration unit rather than deflected away from the refrigeration unit by air eddie currents. The refrigeration unit may abut directly against the scoop rear grill. The refrigeration unit generated hot air is then exhausted through the opening in the housing top wall to the ambient atmosphere.

IN THE DRAWING

Figure 1:
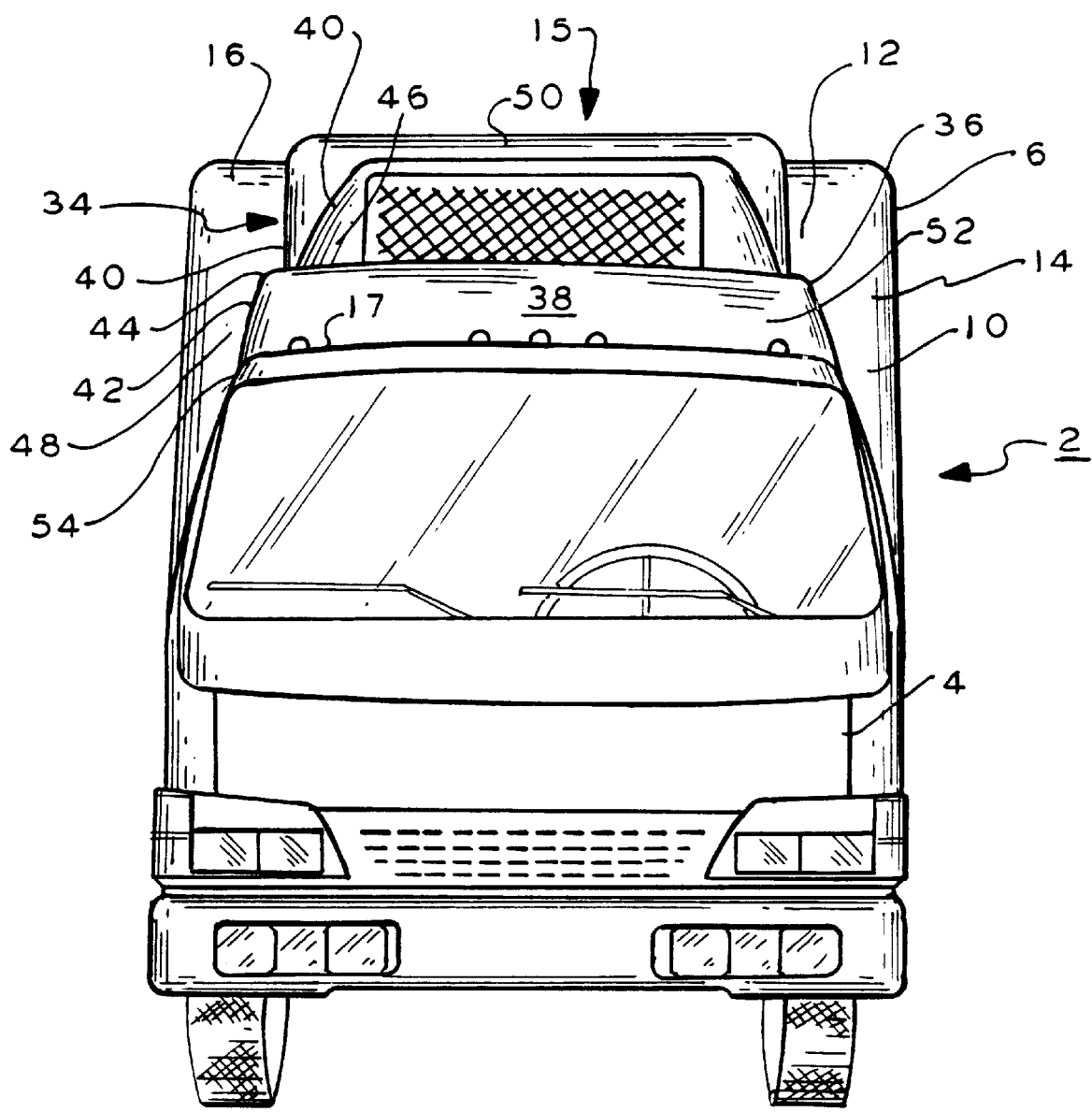
FIG. 1 is a front elevation view of a truck having a cargo body fixed to a common chassis with the cab including an embodiment of the deflector of the present invention attached to the cab roof.
Figure 2:
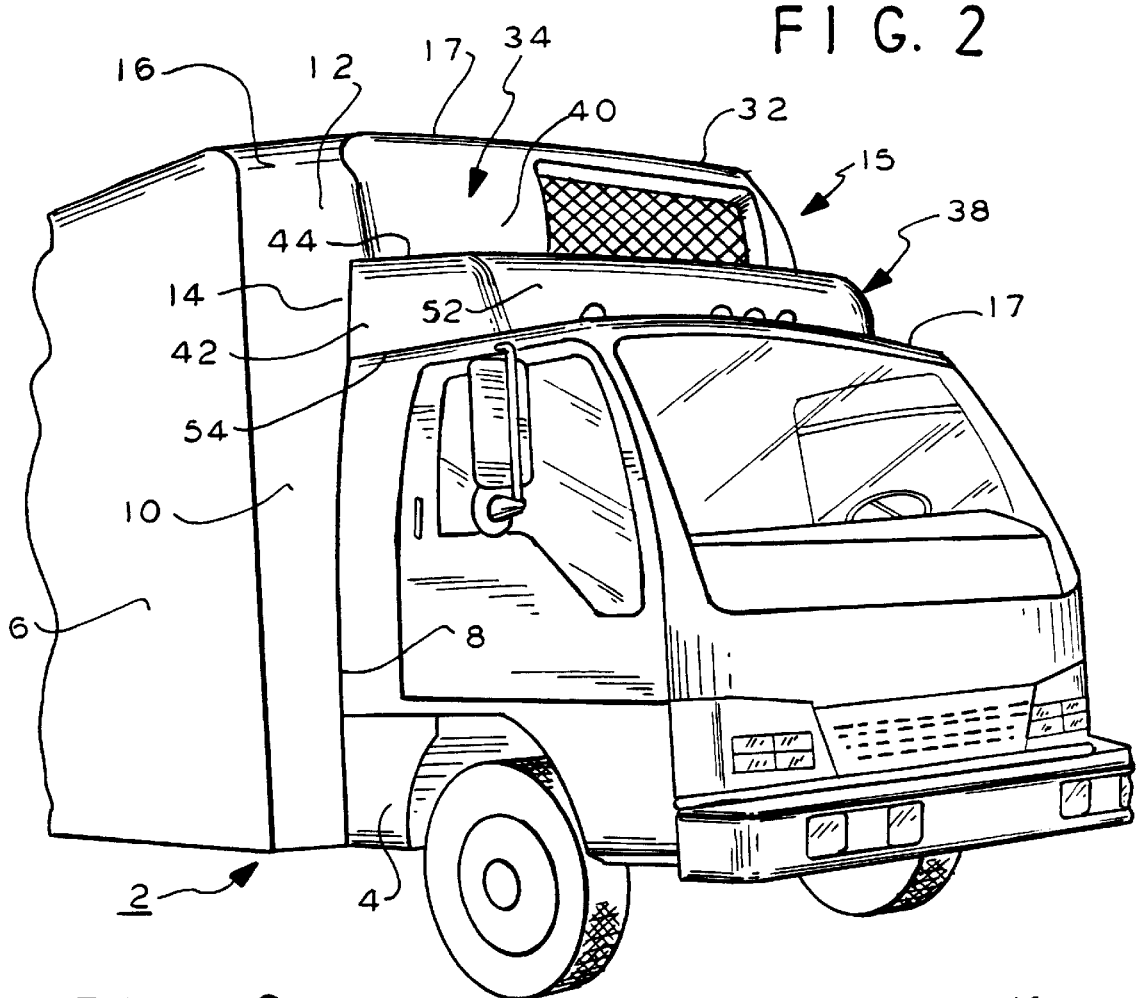
FIG. 2 is a side elevation perspective view of the embodiment of FIG. 1.

In FIGS. 1 and 2, truck 2 comprises a cab 4 and a cargo body 6 all fixed to a common rigid chassis. The cab 4 is attached to the chassis so that it abuts the body 6 at the cab rear at junction 8. The cab is significantly smaller in height and width than the cargo body 6 at regions 10 and 12 of the body 6 front wall 14. As a result, turbulence is created as the truck moves, creating a drag or resistance on the truck 2, which drag is normally undesirable. To alleviate and minimize at least a portion of such turbulence, air deflector 15 is mounted on the cab roof 17. The deflector 15 is aerodynamically shaped for minimizing the turbulence. At the same time, the deflector provides and directs a concentrated air stream to the refrigeration unit for its cooling heat exchanger.

Figure 4:
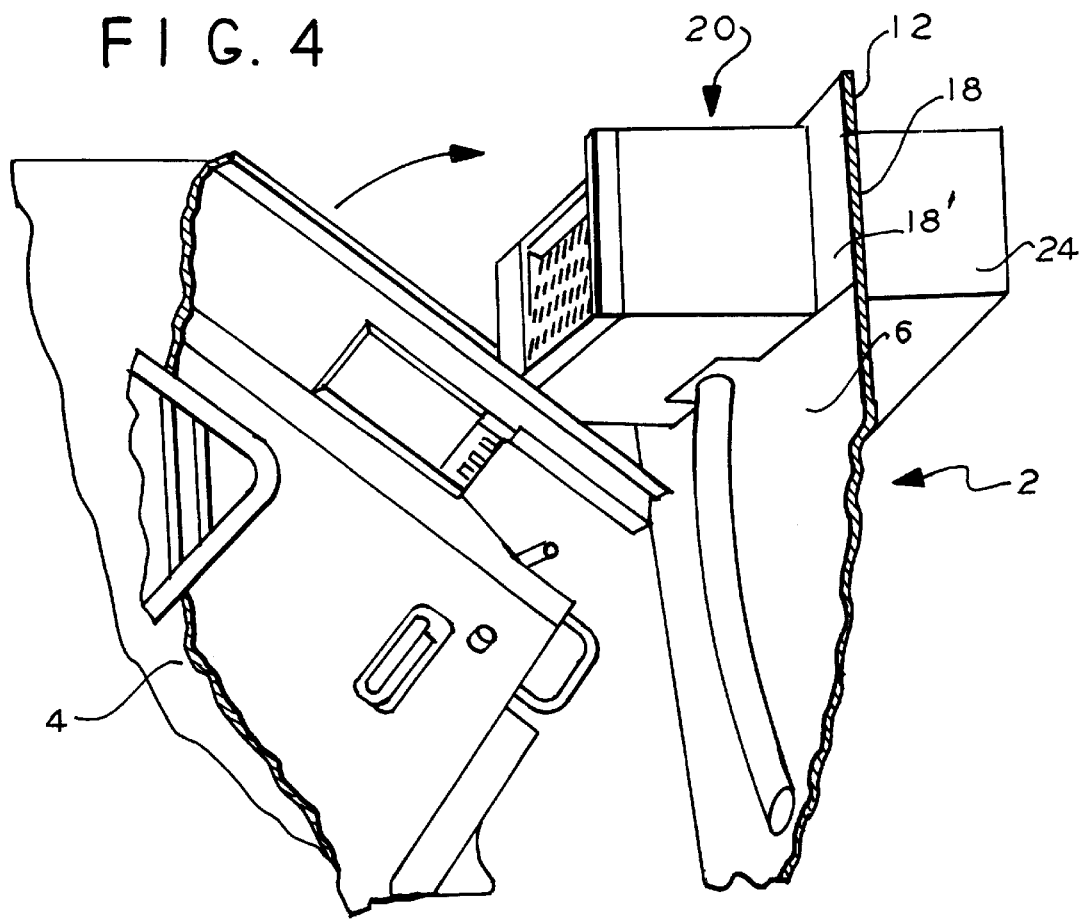
FIG. 4 is a view of the truck of FIG. 1 with the cab tilted to show the refrigeration unit.
Figure 7:
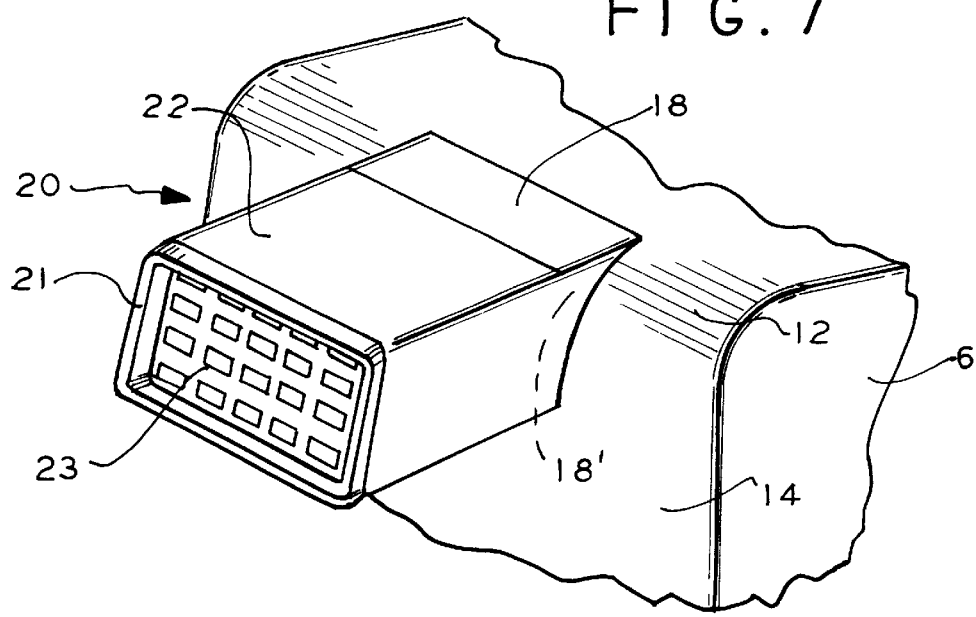
FIG. 7 is an isometric view of an embodiment of the truck cargo body and refrigeration unit.

The truck body 6 front wall 14 has a curved flared portion 16 at the merger of the front wall with the body top wall in region 12. In FIGS. 4 and 7, the region 12 has a dormer 18 added to provide a flat front wall 18' for mounting a one piece refrigeration unit 20. The unit 20 has a flat elastomeric pliable elongated gasket strip 21 surrounding its intake grill 23. The compressor portion 22 has a heat exchanger for receiving intake air, heating the air and exhausting the heated intake air to the ambient atmosphere. The compressor portion 22 is mounted on the outside of the dormer 18. The cooling air exhaust portion 24 of the heat exchanger is mounted inside the body 6. The dormer 18 is provided as it is necessary to mount the cool air exhaust portion 24 at the highest possible point inside the body 6 to maximize the cooling effect inside the body 6 interior. On truck bodies that have front walls that are flat and not flared, a dormer is not necessary.

Figure 9:
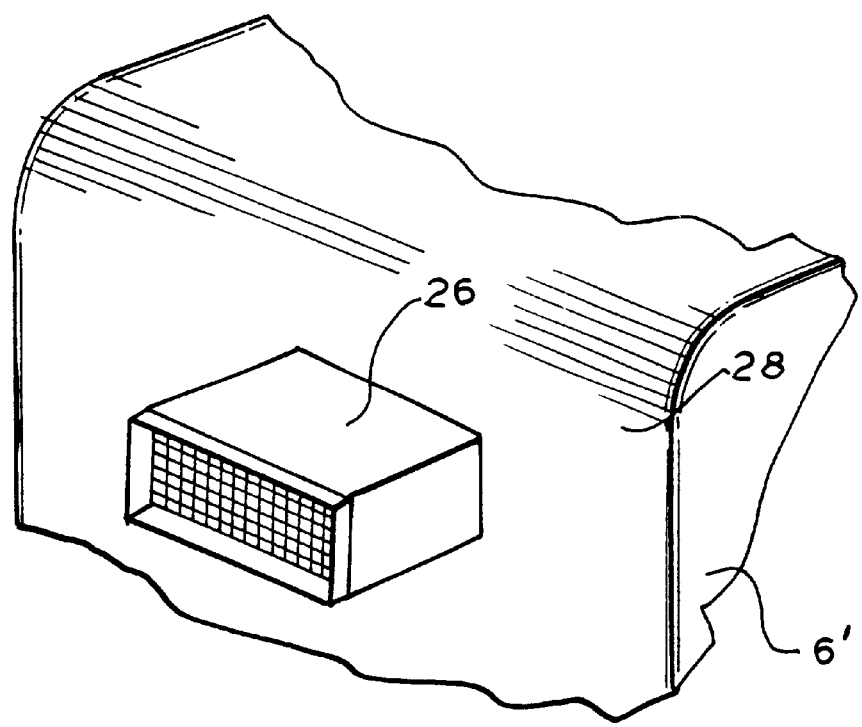
FIG. 9 is an isometric view of the truck cargo body and refrigeration unit of a further embodiment.
Figure 10:
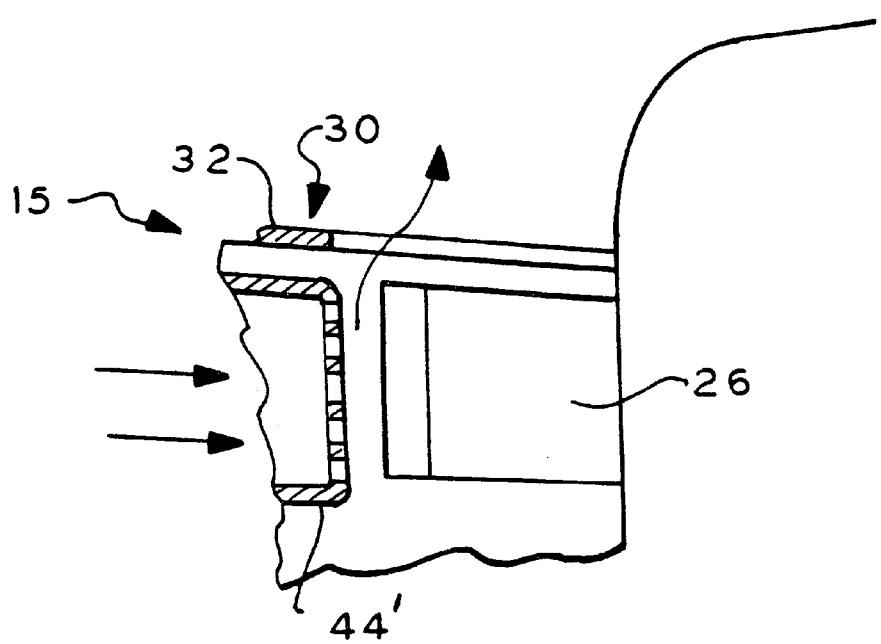
FIG. 10 is a fragmented side elevation sectional view of the truck body of FIG. 9 with an embodiment of the present invention installed.
Figure 11:
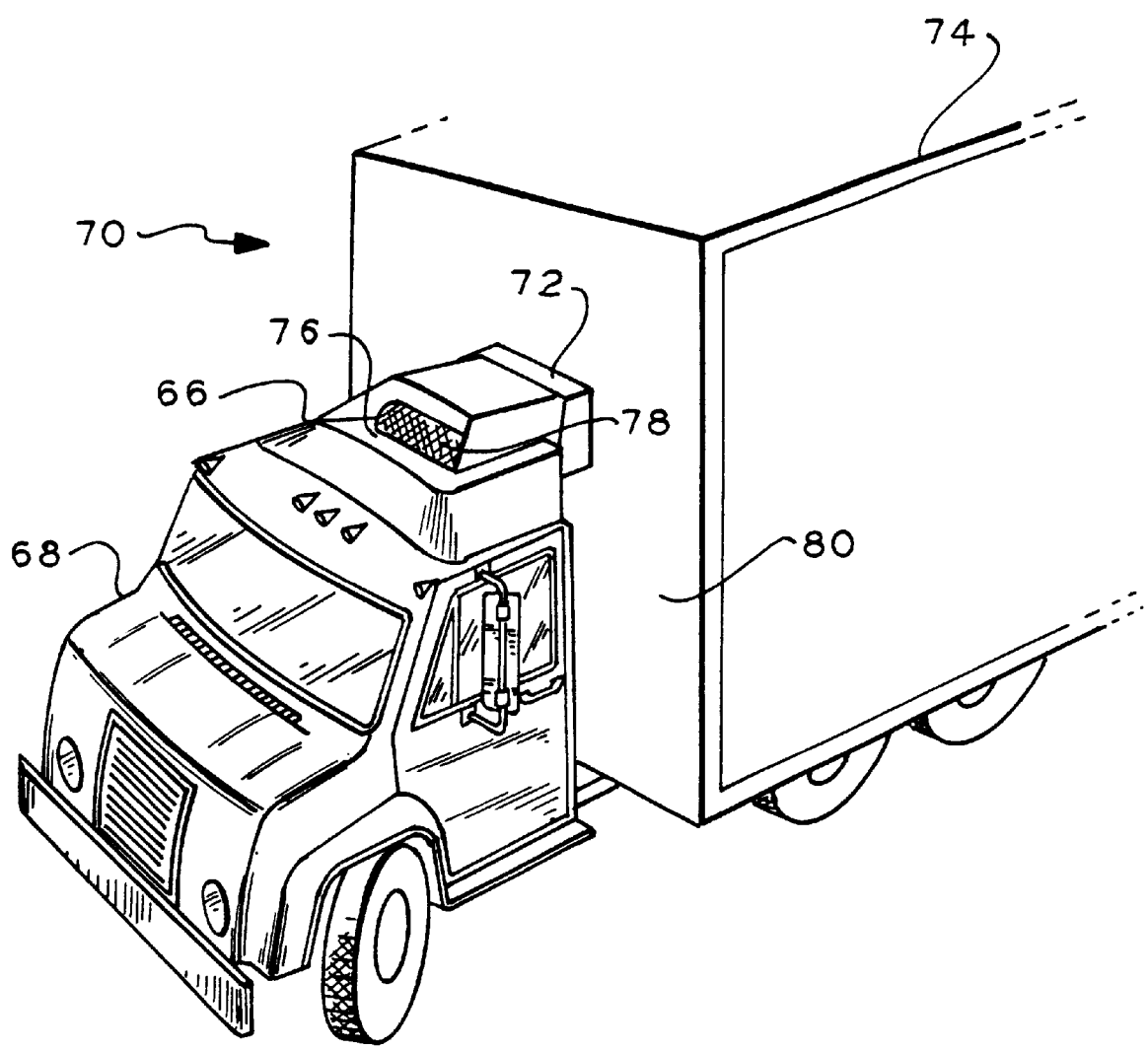
FIG. 11 is an isometric view of a tractor trailer cab and trailer combination with an embodiment of the present invention.

For two piece refrigeration units, such as unit 26, FIG. 9, the compressor portion may be mounted lower beneath the flared portion 28 aligned with the cab roof (not shown in this figure). The cooling unit portion inside the body interior (not shown) is mounted higher adjacent to the body 6' interior ceiling for cooling purposes. Therefore, the deflector 15 may have different heights and dimensions for a given implementation.

Figure 5:
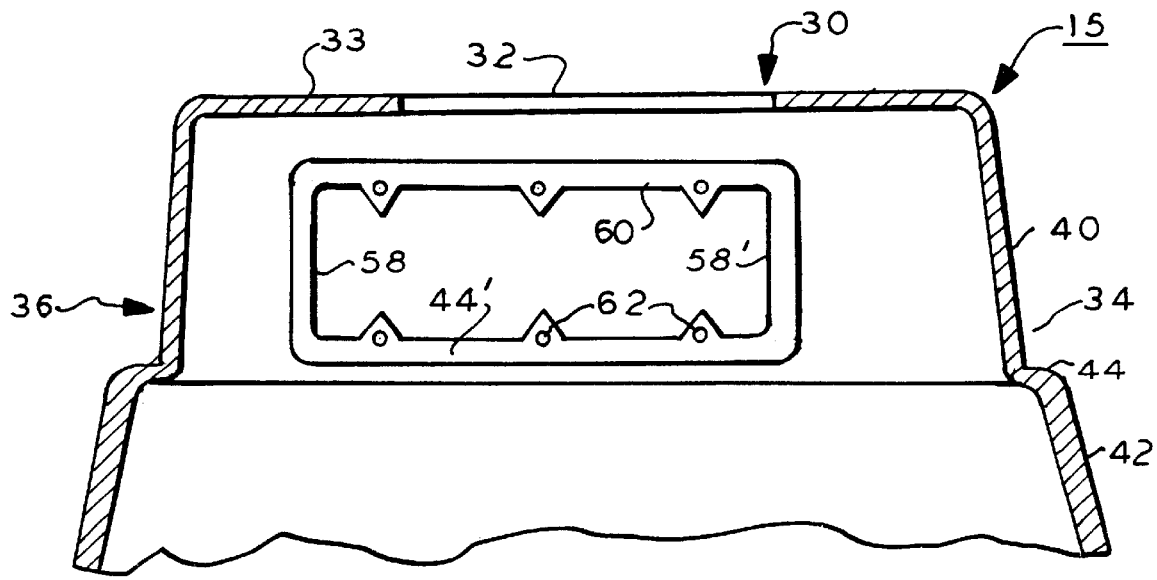
FIG. 5 is a sectional elevation view of the embodiment of FIG. 6 taken along lines 5—5.
Figure 6:
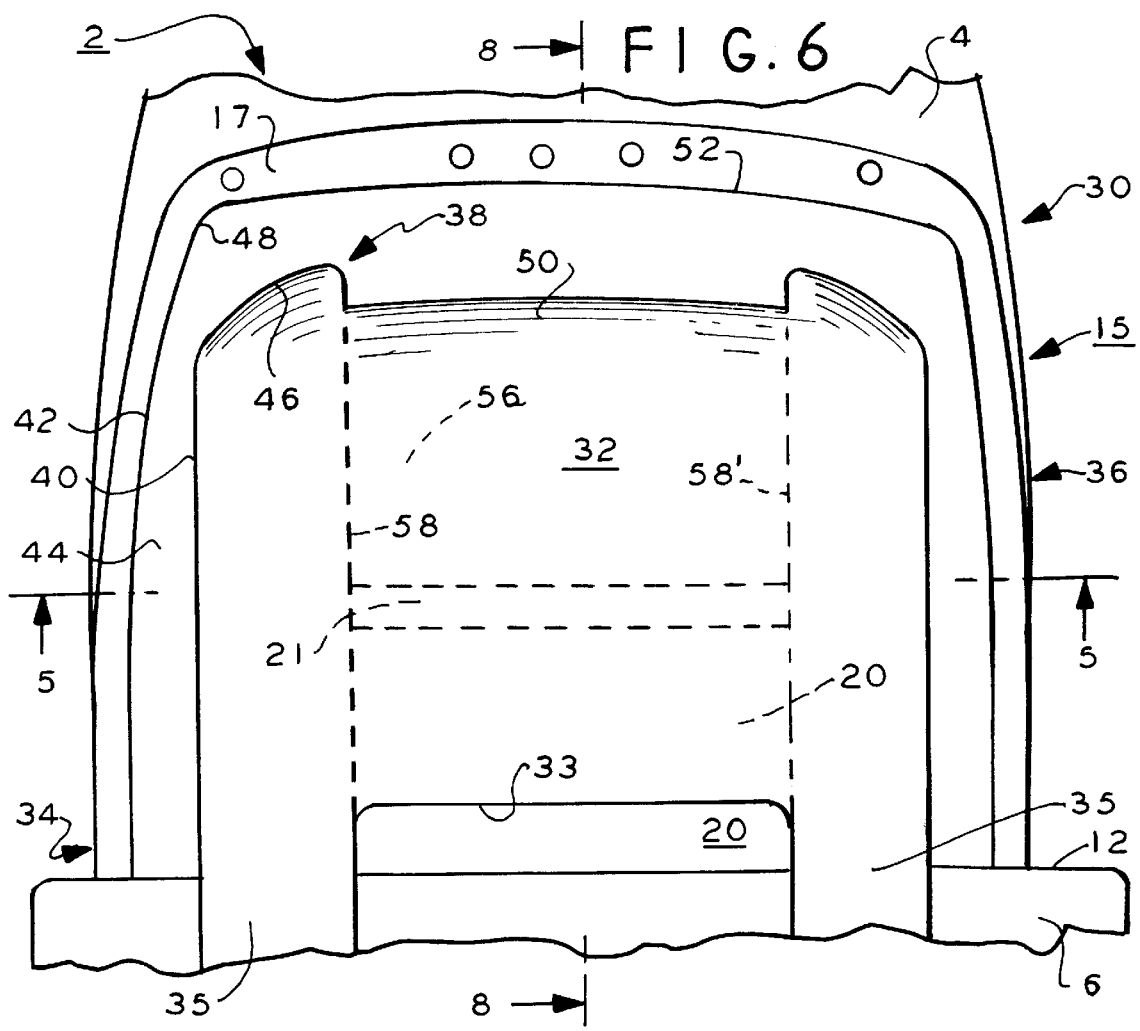
FIG. 6 is a is a top plan view of the deflector and cab portion of the embodiment of FIG. 1
Figure 8:
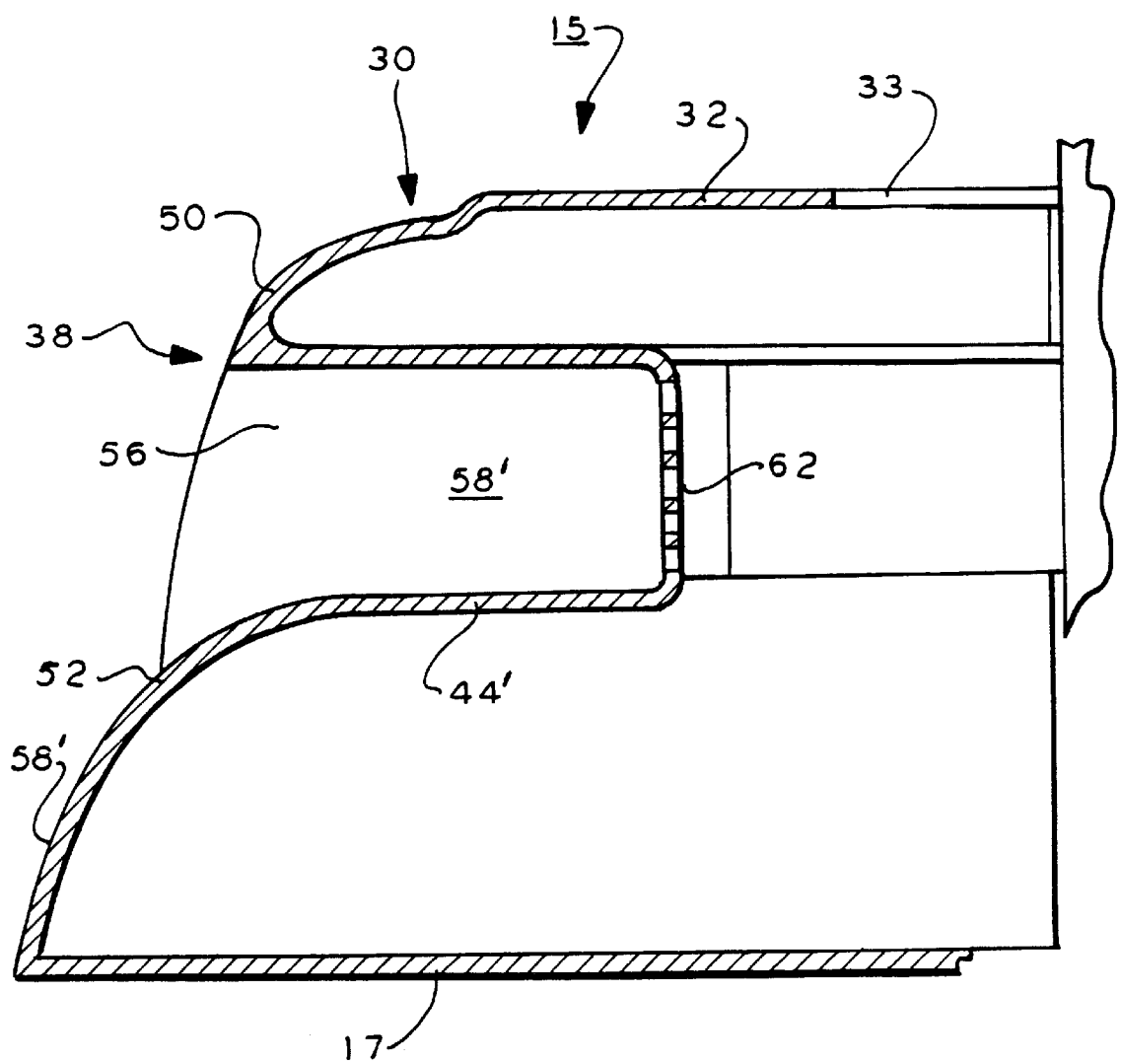
FIG. 8 is a sectional side elevation view of the embodiment of FIG. 6 taken along lines 8—8.

In FIGS. 5, 6 and 8, deflector 15 comprises a one piece stamped sheet metal, preferably steel housing 30. The housing 30 has a top wall 32 and two opposing side walls 34 and 36 which are mirror images of each other depending from opposite edges of the top wall 32. A description of one side wall is representative of the other side wall. The top wall 32 has a U-shaped opening 33 with two arms 35, FIG. 6. This is to permit the heated air from the refrigeration unit 20 to escape to the ambient atmosphere without build up of excessive heat that might otherwise occur in the deflector 15. The opening at the top is not visible from the front and sides of the vehicle and does not contribute significantly to drag. The housing 30 includes a front wall 38. The side wall 34 has two sections 40 and 42 separated by a step 44. The top wall 32 curves where it merges with the section 40.

The side walls 40 and 42 flare in rounded corners 46, 48 respectively where they meet with the front wall 38. The front wall 38 has two sections, upper section 50 and lower section 52 separated by step 44. The lower section 52 has a horizontal corner that is flared and gradually curving downwardly from step 44 to the housing bottom edge 54 where it meets the cab roof 17. Section 52 is rounded at the corner 48 vertically and horizontally to provide an aerodynamic shape. The front portion of lower section 52 curves gradually downwardly in a convex flare from the step 44 to the bottom edge 54.

The upper front wall section 52 has a scoop 56 recess. The scoop 56 has a slightly inwardly tapering side walls 58, 58'. The step 44 forms a bottom wall 44' of the scoop 56. The scoop 56 has a top wall 60 forming a rectangular channel in transverse cross section with bottom wall 44', and side walls 58, 58'. A plurality of triangular flanges 62, FIG. 5, extend inwardly toward each other from the respective scoop side, bottom and top walls. A lattice grill 64 for air flow therethrough is screwed to the flanges 60.

The side walls 34 and 36 terminate at the body 6 front wall 14. The deflector 15 is welded or bolted to the roof 17. Flanges (not shown) may be used to bolt the deflector 15 to the cab roof 17.

The refrigeration unit 20 gasket 21 may abut the scoop exterior rear wall or lattice grill 64 during use as in FIG. 6 to receive the intake air to be heated by the heat exchanger of unit 20 portion 22. In operation, when the vehicle is moving, the impacted air is funneled into a stream in the scoop 56 and directed as a high velocity stream at the refrigeration unit 20 air inlet intake. The opening 33 in the deflector 15 top wall exhausts heat exchanged incoming air from the compressor portion 22. The rounded shape of the deflector provides aerodynamic flow around its exterior minimizing drag and resistance to vehicle motion. The scoop gathers up the air stream for efficient operation of the compressor in the refrigeration unit 20.

In FIG. 14, deflector 66 is mounted on the roof of truck tractor cab 68 of a tractor-trailer truck 70. A refrigeration unit 72 is mounted on front wall of trailer 74. In this case, because the tractor turns relative to the trailer the refrigeration unit is spaced from the scoop 76 lattice grill 78. Not shown are side shields that may be used to fill the space between the cab and trailer to reduce drag in a known manner. The deflector 66 may include pliable extensions extending toward the trailer 74 to further reduce drag and permit the relative turning of the trailer and cab. The scoop 76 concentrates the air flow into a high velocity stream as the truck moves to assist in applying the requisite air flow to the compressor portion of the refrigeration unit 72. The deflector 66 in this case does not need an opening in the top wall thereof due to the spacing of the deflector to the trailer front wall 80. The deflector 66 otherwise is of the same shape and configuration as the deflector 15 of FIG. 1.

Figure 3:
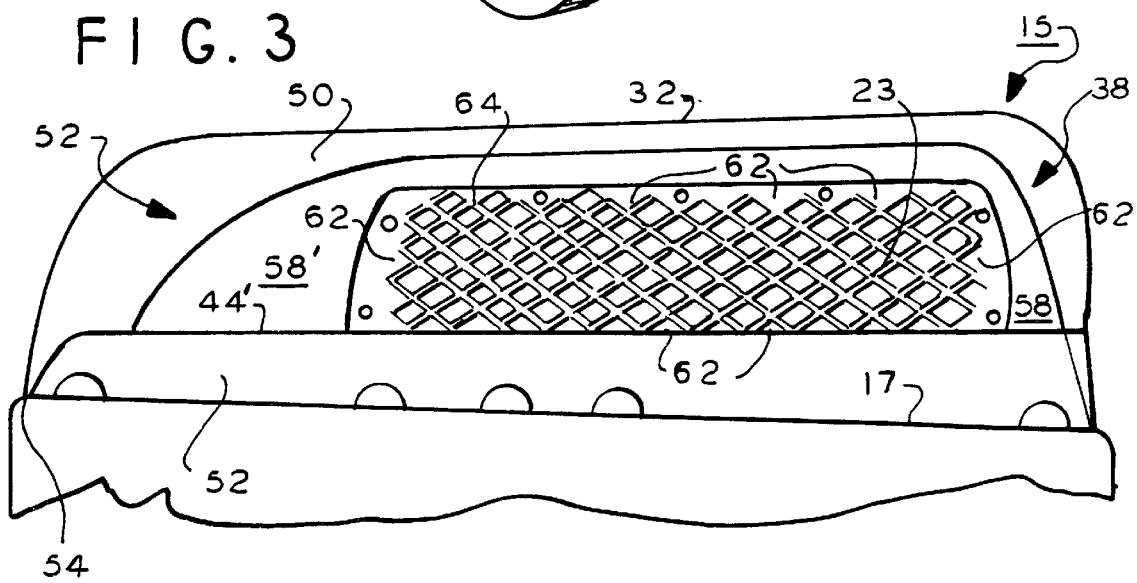
FIG. 3 is a more detailed front elevation perspective view of the front of the deflector of FIG. 1.

The deflector scoop rear opening for the grill 64, FIG. 3, in one embodiment for a Thermo King CB Max refrigeration unit may be about 13 inches by 24 inches with a grill 64 open pattern. The grill openings have the area of approximately a 2 inch diameter. In a further embodiment, the scoop rear grill opening may be about 8 inches by 39 inches. The vertical and horizontal alignment of the scoop rear opening to the refrigeration unit is not critical. However, the grill area and percent grill opening must meet or exceed the requirements for the refrigeration compressor portion of a given refrigeration unit.

An air dam or diverter sheet material members (not shown) in the form of rubber or soft rubber flaps may be used to preclude hot air from the refrigeration unit from recirculating to the intake of the compressor portion and to ensure the hot air is exhausted. The air dam may be placed at the top of the condenser coil compressor portion of unit 20.

What is claimed is:

1. An air detector for a vehicle including a cab and body, the body being different in size than the cab so as to cause turbulent air resistance between the cab and body, and a refrigeration unit attached to the body adjacent to the cab, the deflector for reducing the turbulent air resistance and comprising:

first and second spaced side walls and an interconnected top wall;

an air scoop defining a recess in the front wall and coupled to the side walls and top wall for directing inlet air to said refrigeration unit.

2. The deflector of claim 1 wherein one of the side and top walls have an opening for exhausting hot air from the refrigeration unit to the ambient atmosphere.

3. The deflector of claim 1 wherein the top wall has a through opening therein for exhausting hot air from the refrigeration unit to the ambient atmosphere.

4. The deflector of claim 1 wherein the side walls are arranged to receive the refrigeration unit therebetween so that the refrigeration unit is closely spaced to said scoop.

5. The deflector of claim 1 wherein the top wall has a U-shaped opening therethrough at a rear edge distal said front wall for exhausting hot air from the refrigeration unit.

6. The deflector of claim 1 wherein the scoop has a rear wall distal said front wall, said rear wall including a lattice grill.

7. An air deflector for a vehicle including a cab and body, the body being different in size than the cab so as to cause turbulent air resistance between the cab and body, and a refrigeration unit attached to the body adjacent to the cab, the deflector for reducing the turbulent air resistance and comprising:

first and second spaced side walls and an interconnected top wall forming a chamber;

a front wall connected to the side and top walls; and an air scoop in the chamber and defining a recess in the front wall and coupled to the side walls and top wall in spaced relationship thereto and therebetween for directing inlet air to said refrigeration unit.

8. The air deflector of claim 7 wherein the scoop depends into said chamber from said front wall.

9. The air deflector of claim 7 wherein the front wall defines an opening spaced from the side and top walls, the scoop being defined by at least one side wall arranged to funnel air in a channel spaced from said side and top walls.

10. The air deflector of claim 9 wherein the front wall opening has first a transverse area, the scoop having a rear opening spaced from the front wall opening, the rear opening defining a second transverse area smaller in value than the front wall first opening.

* * * * *